United States Patent [19]

Marsh et al.

[11] 4,397,899
[45] Aug. 9, 1983

[54] VARIABLE THICKNESS MAT FOR USE AT THE STRESS TRANSITION ZONE JUNCTURE OF A BRIDGE-ROADWAY OR THE JUNCTURE OF A RAILROAD CROSSING-ROADWAY

[75] Inventors: Ronald P. Marsh, St. Louis, Mo.; Robert W. Luebke, Ponte Vedra, Fla.

[73] Assignee: True Temper Corporation, Cleveland, Ohio

[21] Appl. No.: 193,886

[22] Filed: Oct. 3, 1980

[51] Int. Cl.³ .................... B32B 5/00; B32B 5/26
[52] U.S. Cl. ......................... 428/77; 404/28; 404/74; 428/172; 428/212; 428/213; 428/215; 428/284; 428/287; 428/290; 428/297; 428/298; 428/299; 428/300; 428/301; 428/340; 428/369
[58] Field of Search ............... 428/77, 172, 212, 213, 428/215, 284, 287, 289, 290, 297, 298, 299, 300, 301, 340, 369, 220

[56] References Cited

U.S. PATENT DOCUMENTS

| | | | |
|---|---|---|---|
| 3,402,227 | 9/1968 | Knee | 264/64 |
| 3,587,964 | 6/1971 | Cork | 238/1 |
| 3,670,506 | 6/1972 | Goumbard | 61/35 |
| 4,265,398 | 5/1981 | Luebke | 428/317.9 |
| 4,311,273 | 1/1982 | Marsh | 428/287 |

*Primary Examiner*—James J. Bell
*Attorney, Agent, or Firm*—Baldwin, Egan, Walling & Fetzer

[57] ABSTRACT

A variable thickness fabric mat for use at a stress transition zone juncture such as at a bridge-roadway juncture or a railroad crossing-roadway juncture, for more evenly spreading the stress forces from traffic thereover to the underlying support surfaces. The variable thickness mat is preferably formed of non-woven fabric and is of variable thickness in a direction lengthwise of the mat as well as in a direction transverse of the mat.

15 Claims, 7 Drawing Figures

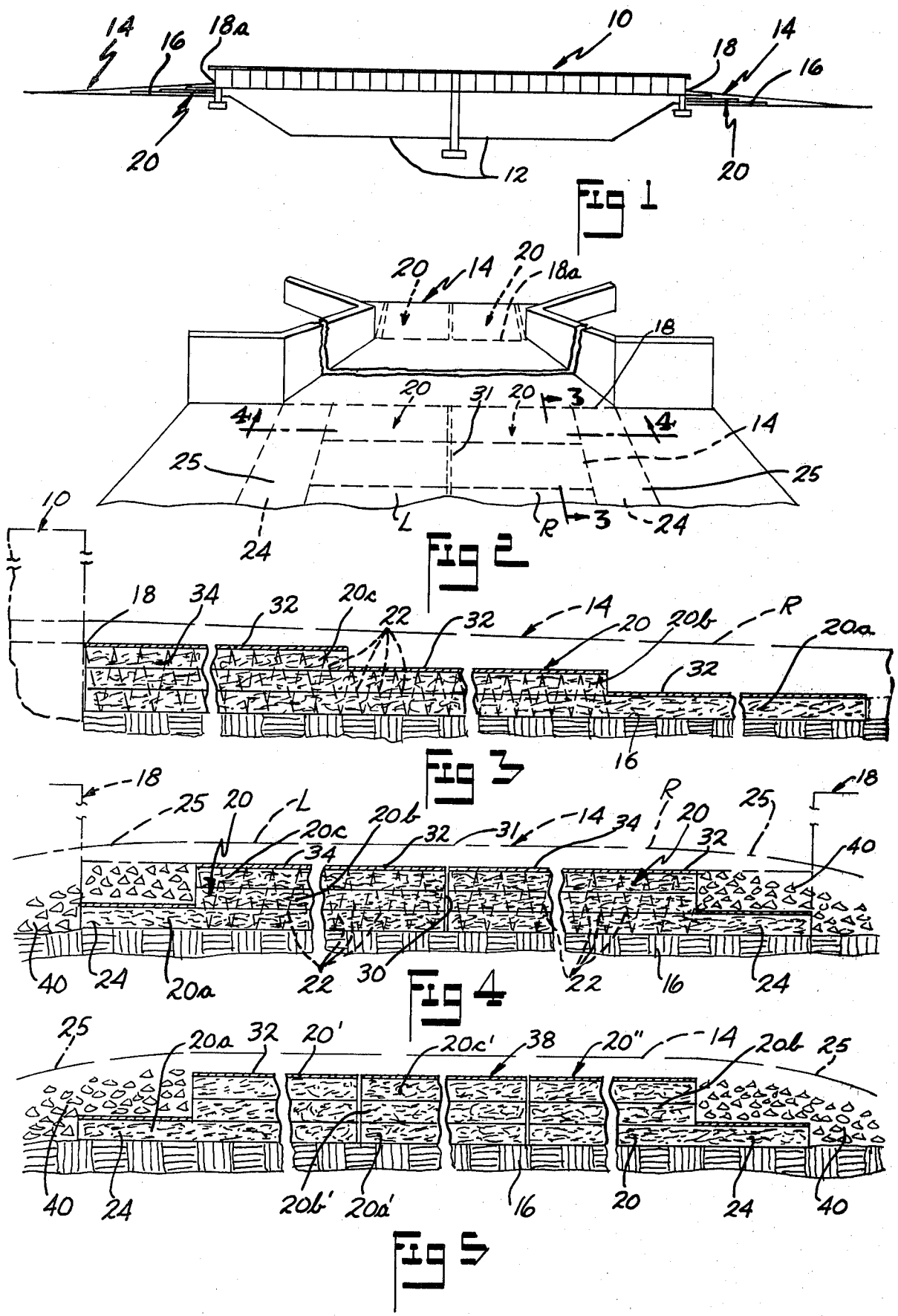

VARIABLE THICKNESS MAT FOR USE AT THE STRESS TRANSITION ZONE JUNCTURE OF A BRIDGE-ROADWAY OR THE JUNCTURE OF A RAILROAD CROSSING-ROADWAY

This invention relates in general to a resilient, fabric mat adapted for use, for instance, at a juncture between a bridge-roadway or at a juncture between a railroad crossing-roadway or the like, and adapted to underlie the roadway for a predetermined length prior to said juncture for spreading the stress loads from traffic approaching and moving over the juncture, over a greater area, and for more uniformly and progressively distributing the stress loads, thereby more uniformly distributing the stress forces to the roadway structure, and more particularly relates to a variable thickness fabric mat for underlying the roadway structure and wherein the thicker portion thereof is disposed at the bridge-roadway or railroad crossing-roadway junctures, and the thinner lengthwise portions thereof in a direction lengthwise thereof, extend beneath the lengthwise extent of the roadway, while the lateral thinner shoulder portions of the mat extend laterally from the thicker portion. The mat aids in drainage of water from the underlying supporting soil and helps in stabilization of poor support areas of soil. A method of utilizing the mat in the environment specified is also disclosed.

BACKGROUND OF THE INVENTION

Non-woven webs of fabric having variable thickness are known in the art, as shown for instance in U.S. Pat. No. 3,402,227, dated Sept. 17, 1968. Also the use of non-woven fabric on earthern surfaces to spread the stress from a roadway or a railway communication route over wider areas, are known in the art, with such fabric being formed for instance of non-woven polyester, and having the ability to filter out fine soil particles that would or could otherwise contaminate the roadway support bed or the railroad track support bed, and also possessing the capability of passing water through the mat so as to actually to aid in drainage of water from the soil beneath the mat. U.S. Pat. No. 3,670,506, dated June 20, 1972, entitled "Process for Stabilizing Soils" is directed to a method of utilizing non-woven fabric in poor support areas.

Also the use of mats for protecting bridge decks in a railroad environment are known such as for instance from U.S. Pat. No. 3,587,964, dated June 28, 1971.

However, to applicants' knowledge, these prior art mats in a roadway or railroad environment were of generally uniform thickness throughout. Such prior art mats are generally one unitary member formed of predetermined uniform thickness of fabric material and cut into predetermined lengths for use at the site of use.

Moreover, in applicant Marsh's pending U.S. patent application, Ser. No. 134,787, filed Mar. 28, 1980, now U.S. Pat. No. 4,311,273, and entitled "Variable Thickness Fabric Mat for Railway Track Structure and Method" and applicant Luebke's U.S. patent application, Ser. No. 92,709, filed Nov. 9, 1979, now U.S. Pat. No. 4,265,398, and entitled "Variable Thickness Mat for Stress Transition Zones of Railway Track Crossings Switches and the Like and Method of Use", there are disclosed various configurations of fabric mat for use in the environmental areas specified.

SUMMARY OF THE INVENTION

The present invention provides a novel variable thickness mat for use at a stress transition zone juncture, such as for instance at a bridge-roadway juncture, or at a railroad crossing-roadway juncture, or the like, beneath the roadway, for more envenly and progressively spreading the stress forces from traffic moving thereover to the underlying support surfaces. The variable thickness mat is preferably formed of non-woven fabric and is of variable thickness in a direction lengthwise of the mat as well as in a direction transverse of the mat.

Accordingly, an object of the invention is to provide a novel variable thickness mat for use beneath a roadway at a stress transition zone juncture between, for instance, a bridge-roadway or at the juncture of a railroad crossing-roadway, or the like, for more uniformly and progressively applying the force loads due to traffic moving thereover, to the underlying bearing areas, and which will not impede drainage of ground water, but will instead actually facilitate the latter.

Another object of the invention is to provide a mat of the aforementioned type which is formed of non-woven fabric.

A still further object of the invention is to provide a mat of the aforedescribed type which is comprised of a plurality of layers of fabric material, with means connecting the layers together to form an integral mat member.

A still further object of the invention is to provide a mat of the aforementioned type which is of stepped configuration in a direction lengthwise of the mat as well as in a direction transverse of the mat, and wherein the thickest portion of the mat is adapted for disposal adjacent the juncture of the roadway and the associated bridge or crossing structure, beneath the roadway, with the thinner lateral portions of the mat assembly being disposed along the side boundaries of the roadway, and with the stepped configuration in a direction lengthwise of the mat progressively become thicker from one lengthwise end thereof to the other lengthwise end thereof in a direction toward said juncture.

A still further object of the invention is to provide a mat of the aforementioned type which comprises layers of non-woven fabric together with means conecting the layers together into an integral mat member.

A still further object of the invention is to provide in conjunction with a stress transition zone juncture between a bridge and a roadway or between a railroad crossing and a roadway, a mat of the aforediscussed type, for aiding in reducing the stresses applied to the supporting surfaces at the juncture by traffic moving thereover.

Other objects and advantages of the invention will be apparent from the following description taken in conjunction with the accompanying drawings wherein:

BRIEF DESCRIPTION OF THE DRAWINGS

FIG. 1 is a generally diagrammatic, side elevational illustration of bridge-roadway junctures utilizing the variable thickness mats of the invention;

FIG. 2 is a generally diagrammatic perspective view taken from one end of the bridge looking lengthwise thereof, and illustrating the mats of the invention disposed beneath the roadway at the junctures of the roadway-bridge structure;

FIG. 3 is an enlarged broken sectional view taken generally along the plane of line 3—3 of FIG. 2 looking in the direction of the arrows;

FIG. 4 is an enlarged, broken, sectional view taken generally along the plane of line 4—4 of FIG. 2 looking in the direction of the arrows;

FIG. 5 is a view similar to FIG. 4, but showing a modified assembly of mat;

DESCRIPTION OF PREFERRED EMBODIMENTS

Figure 6:
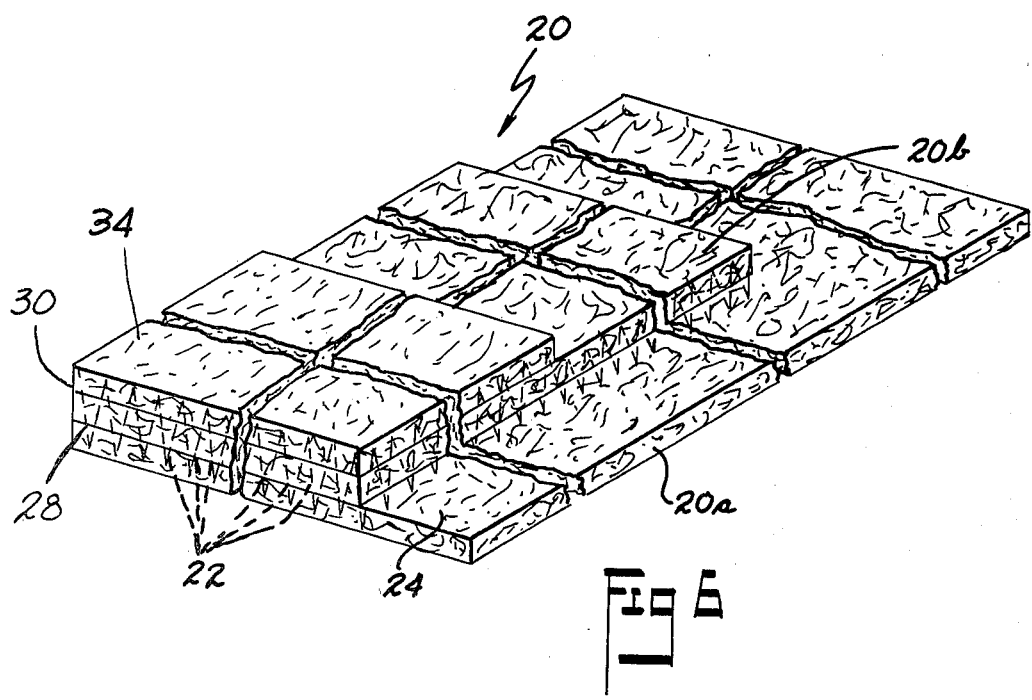
FIG. 6 is a partially broken perspective illustration of one of the mats of the mat assembly illustrated in FIGS. 3 and 4.

Referring now again to the drawings, there is illustrated in FIGS. 1 and 2 a bridge structure 10 which, in the embodiment illustrated, extends across for instance a divided highway, or railway right of way 12, and which is utilized in conjunction with a roadway 14 for vehicle traffic. The roadway 14 conventionally abuts or junctures with both ends of the bridge 10, and extends therefrom, to thereby provide for movement of roadway traffic on the bridge and over the underlying right of way 12. Roadway 14, it if is of the highway type, may be conventionally formed of concrete or of asphalt, and is adapted to be laid in the conventional manner on a prepared ground surface 16 (FIGS. 3, 4 and 5). Roadway 14 could also be a railroad track roadway for trains. Sometimes such roadway support surface 16 is rather soft or unstable, and as such does not provide as good a support as is desired for the roadway. Therefore, the forces applied to the roadway by traffic moving thereover can effect the stability of the roadway and cause undue stress on the road structure, including failure of the concrete and/or asphalt body thereof. Moreover, at the junctures 18, 18a of the bridge and the roadway (FIG. 1) there are stress transition zones wherein the stress loads from the moving traffic are usually comparatively suddenly applied to the roadway structure and to the bridge structure and vice-versa, at junctures 18, 18a.

Accordingly, in order to aid in stabilizing the ground bearing surfaces 16 and to more uniformly and progressively apply forces from vehicle traffic moving over the roadway to the underlying bearing areas and to the bridge structure, there is provided in accordance with the invention a variable thickness fabric mat 20 beneath the roadway structure at the junctures of the roadway and the bridge.

Such mat 20 in accordance with this invention is of variable thickness in a direction lengthwise of the mat as well as in a direction transverse of the mat, with the mat providing a stepped configuration in a lengthwise direction thereof as well as in the transverse direction, the thickest portion of the mat being disposed adjacent one end thereof and with the thinner portions of the mat extending laterally outwardly from the thicker portion thereof.

In the embodiment illustrated, the mat 20 is formed of a plurality of layers of fabric material and preferably non-woven fabric material, comprising, in FIGS. 3 and 4, a bottom layer 20a of fabric, an intermediate layer 20b of fabric, and an upper layer 20c of fabric, including means 22 (FIG. 6) connecting or bonding the layers forming the mat 20 together. Such connecting means, in the embodiment illustrated, comprises intertwined fibers of the various layers of fabric, which intertwined fibers may be produced by needle punching of the layers in a known manner, resulting in an integral mat member.

In the embodiment illustrated in FIGS. 3, 4 and 6, the uppermost layer 20c and the intermediate layer 20b may be approximately twelve feet wide while the bottommost layer 20a may be approximately fourteen and one-half feet in width, thus providing the lateral shoulder or side portions 24 to the mat structure. It will be seen, therefore, that each traffic lane L, R (FIG. 2) for roadway 14, each lane of which is conventionally of approximately twelve feet in width, will overlie the thicker portions of the underlying mat structure, while the side shoulders 25 (FIGS. 2 and 4) on the roadway 14 will overlie the respective lateral shoulder portion 24 of the mat structure.

Bottommost layer 20a may be approximately three hundred feet in length while the intermediate layer 20b may be approximately two hundred feet in length, with the uppermost layer 20c being approximately one hundred feet in length, thus making an overall length of mat of approximately three hundred feet. It will be noted that all of the defining end surfaces of the mat's layers are generally coplanar at one end 28 (FIG. 6) of the mat, while the defining side surfaces of the layers 20a, 20b and 20c are likewise coplanar as at 30, at one lengthwise side surface of the mat. As can be seen in FIG. 4 such coplanar side surfaces 30 of the pair providing the underlying mat structure, are adapted to be disposed in generally juxtaposed condition running generally beneath the centerline 31 (FIGS. 2 and 4) of the roadway 14.

Non-woven fabrics for use in the construction of roadways and railroad track structures are well known. These known fabrics are made from a plurality of materials, such as for instance polyesters, and are available from a plurality of companies, including the assignee of the present invention.

Mechanical interlocking of the fibers of the layers of the mat may be provided by needle punching and may be produced in the conventional manner on needle looms, with the layers of the fabric making up the mat being passed into the loom and being connected as the barbed needles pass downwardly through the layers, interlocking engaged fibers of the mat structure into individual groups. The end result is a flexible layered, liquid pervious mat of high stability, with the layers (e.g. 20a, 20b, 20c) thereof being secured together by the punched fiber groups as diagrammatically illustrated at 22.

Chemical binders of suitable known types may also be utilized betweem layers of the mat for aiding in connecting the layers together. For most purposes, however, and for the purposes of underlying roadway structure at bridge and railroad crossing junctures, and with which the present product is particularly adapted for use, needle connecting or bonding is adequate and is preferred.

The mats are expeditiously utilizable with poor load bearing soils, and form an effective resilient support bed for the roadway structure in such an environment, to help support and progressively spread the forces from wheeled traffic over the roadway to the underlying ground bearing areas 16, and results in materially diminishing the stresses applied to the roadway structure at the stress transition zones of junctures 18, 18a.

The mats are adapted to readily pass run-off water lengthwise and transverse thereof, and facilitate the drainage of water from the roadway support without impeding drainage thereof. The mats actually facilitate by surface tension the passage of ground water from the underlying bearing ground surfaces 16, and filter out soil particles that might otherwise contaminate and/or reduce the stability of the roadway bed. While the mat assembly is illustrated in FIGS. 3 and 4 as being laid directly on an earth surface, such support surface could include ballast or the like, for providing the roadway bed support.

In the mat structure illustrated in FIGS. 3, 4 and 6, each of the layers 20a, 20b, and 20c thereof may be from approximately 60 mils to approximately 100 mils in thickness, and in the thickest portion 34 (FIGS. 2 and 6) thereof comprising a mat of approximately 180 mils to approximately 300 mils thickness. The thickness of each fabric layer of a particular mat is preferably approximately the same as the thickness of the adjacent fabric layers. The top surface of the mat may be provided with a non-pervious coating layer 32, such as an asphaltic coating (FIGS. 3 and 4) which aids in bonding the roadway 16 to the underlying mat, which is especially true if the roadway proper is formed of asphalt, and also aids in resisting puncturing of the top surface of the mat. Such a coating may be applied by spraying or any other suitable means and readily ataches or bonds itself to the underlying surface of the mat layers.

At least one, and preferably all of the fabric layers 20a, 20b and 20c of the mat are saturated, by any suitable means, such as for instance by dipping or by spraying, with a resin-like binder, such as for instance a synthetic thermosetting self cross linking acrylic copolymer emulsion (e.g. Nacryl No. 977 obtainable from Derby Chemical Company of Ashland, Mass.) Thereafter the non-woven fabric layer (or layers) of material is preferably subjected to a blast of air which is operable to drive off excess binder. The fabric is then oven dried at a suitable, known temperature, to set the resin-like material dispersed throughout the fibers or filaments of the fabric.

Such a resin-like impregnating treatment of the non-woven fabric does not materially affect the permeability of the fabric to fluid flow, but does substantially increase the tensile strength of the needle punched, non-woven fabric, as well as increasing the abrasion resistance of the fabric.

Thereafter the resin-like impregnated fabric layer (e.g. layer 20c, if only one layer has been so treated) is passed through the needle loom together with the other layers (e.g. 20a and 20b) of which the mat 20 is to be formed, and is needle punched by the needle barbs of the loom, to mechanically bond or connect the layers 20a, 20b and 20c together into an integral mat.

The flexible, generally resilient mats may be provided in any desired lengths, with the aforementioned length of three hundred feet being a convenient length for handling and which can be rolled up and dropped off at the site of use for laying on the bearing ground surface that has been prepared, such as for instance by leveling thereof by a bulldozer or the like, prior to placing of the mat thereon.

The choice of denier per filament or fiber used in the non-woven fabric layers comprising the mat is governed primarily by the requirements of the end product. However, denier in the range of 3 to 9 is preferred for use in the mats of the invention. In any event, each of any layer thereof which has been impregnated with the aforementioned resin-like binder in the mat of FIG. 3 preferably possesses a weight of approximately 8 to 12 ounces per square yard. A layer of the mat which has not been so impregnated preferably possesses a weight of approximately four to six ounces per square yard. The fibers or filaments of the mat layers are illustrated as being of the non-continuous or cut type, but could also be of the continuous type filament. With non-continuous filaments, a filament length of approximately 3 to 4 inches is preferred.

The fabrics used in the mat are preferably resistant to attacks by the components normally found in soils and in ground water, and aid in maintaining the roadway base well drained. The mat fabric may be of such a poracity that the mat will hold back particles generally larger than 70 microns, while usuallyy permitting small water-borne fines to pass through the mat, without clogging or binding the fabric, thus insuring relatively little resistance to the movement of ground water transverse of and lengthwise through the mat.

Referring now to FIG. 5, there is illustrated another embodiment of mat assembly for use beneath a roadway track structure. In this embodiment, there is provided a central mat section 38 which is of generally uniform width in a direction transverse thereof (i.e., it does not embody any lateral shoulder portions) and may be formed of the same plurality arrangement of layers of mat material 20a', 20b' and 20c' as in the first described embodiment. The lateral side mats 20' and 20" may be formed generally similar to the mat 20 of the first described embodiment, although they may be of reduced width as compared to the width of the first described embodiment. When the mat sections 38 and 20' and 20" are assembled together in side-by-side, generally juxtaposed condition, it will be seen that there is provided a mat assembly which progressively increases in thickness in a direction lengthwise thereof, and which also possesses thinner shoulder portions 24 thereon extending laterally from the thicker portion thereof. Such FIG. 5 mat assembly may be utilized, for instance, in wider than usual roadway installations, or in installations utilizing mats of a narrower overall width as compared to those of the general type of FIGS. 3 and 6. Such FIG. 5 mat assembly sections may be provided with a coating 32 on the top surface thereof in a similar manner in the first described embodiment. It will be seen that the side shoulder portions of the mat assembly of FIGS. 4 and 5 may be covered with fill, such as for instance rock ballast 40 in providing a support base for the overlying shoulder portions 25 of the roadway 14. Coating 32 on such shoulder portions 24 aid in resisting puncturing of the shoulder portion by the ballast 40.

Figure 7:
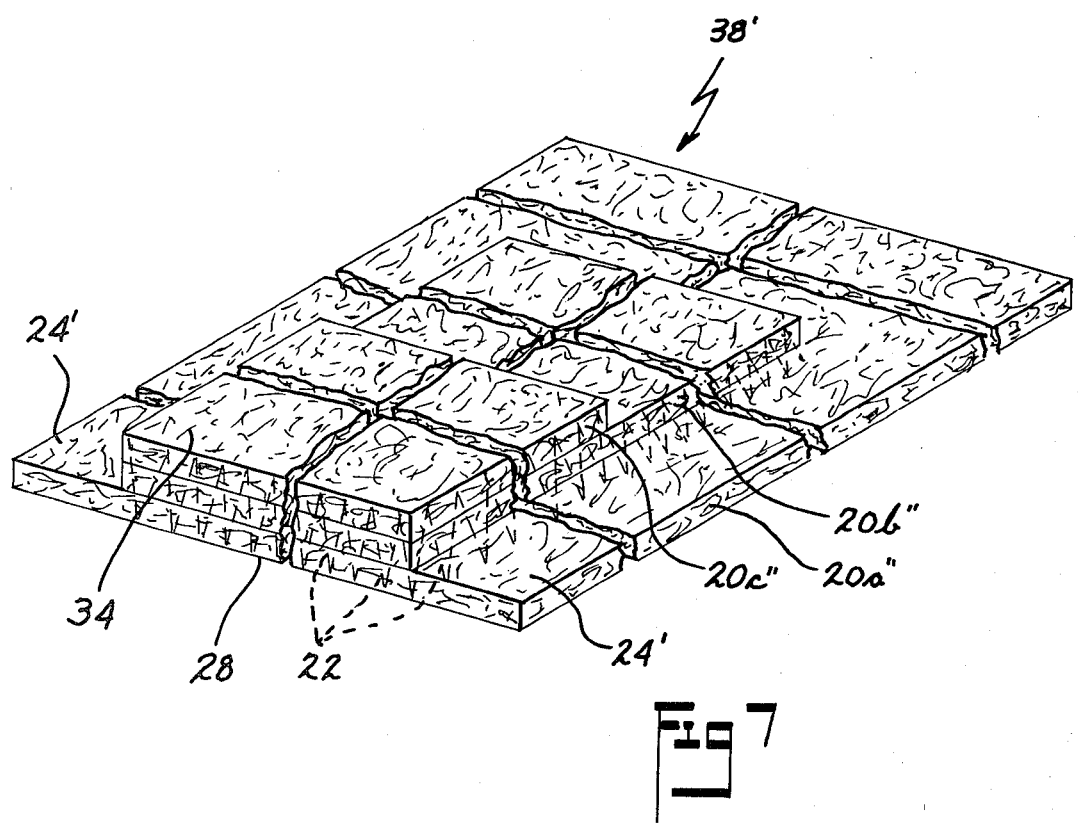
FIG. 7 is a view generally similar to FIG. 6, but illustrating a modified form of mat.

Referring now to FIG. 7, there is illustrated another embodiment of mat 38' in which the thickest portion 34 of the mat is generally centrally located on either side of the lengthwise centerline thereof, so that rather than utilizing two mats to provide a resilient base for underlying both traffic lanes of the roadway, as in the FIGS. 2 and 6 embodiment, one mat is provided, with such mat having a centralized thicker portion stepped in a direction lengthwise thereof, and lateral thinner shoulder portions 24' extending laterally from the thicker portion thereof. In other respects, the FIG. 7 mat structure may be generally similar to that of the aforediscussed mat fabrications. Here again the thicker portion 34 of the layers of the mat have their end surfaces generally coplanar at one end 28 of the mat structure, while the side surfaces of the layers 20c'' and 20b'' have their side surfaces generally coplanar.

While no coating of the top layer of the respective mat is illustrated in FIGS. 6 and 7, it will be understood that, if desired, such a coating layer of abrasion resistant material, such as asphalt, could be readily provided. Such a coating layer 32 may be formed of a material other than the aforementioned asphalt, and as for instance rubber or flexible plastic. Such a coating of said materials will likewise resist wear and puncturing of the mat by the overlying roadway structure, and as aforementioned. While such a surface coating layer will substantially prevent the passage of water vertically down through the mat, it will have no effect on water passage horizontally through the mat and/or upwardly into the mat from the underlying ground surface 16.

It will be seen that in all of the various embodiments of mat, they provide a generally resilient flexible support for the overlying roadway and more uniformly and progressively distribute the forces applied to the roadway by vehicles moving thereover to the underlying ground support surfaces, and more progressively apply the load stresses to the stress transition zone junctures of a roadway and a bridge or of a roadway and a railroad crossing structure. Moreover, these various mat structures increase the elimination of water from the underlying and adjacent ground bearing surfaces to thereby aid in stabilizing the ground bearing surfaces and thus further aid in reducing stresses applied to the roadway structure itself by traffic moving thereover. While a roadway-bridge juncture has been illustrated in the drawings, it will be understood that the same situation and arrangements of mat assembly may be utilized at a roadway-railroad crossing juncture.

From the foregoing description and accompanying drawings, it will be seen that the invention provides a novel variable thickness mat adapted for use beneath a roadway structure at the stress transition zone junctures of a bridge-roadway, or the juncture of a railroad crossing-roadway, for spreading the load on the roadway structure over increased area and for more progressively applying the stresses in the transition zone from the roadway to the bridge or railroad crossing structures. The invention also provides a mat structure which includes a thicker portion at one lengthwise end thereof and which is stepped in a direction lengthwise of the mat, as well as thinner shoulder portions extending laterally of the thicker portion.

The invention also provides a mat structure adapted for use with a roadway construction at stress transition zone junctures between, for instance, a bridge and the roadway or between, for instance, a railroad crossing and a roadway, for improving the stress bearing conditions of the ground bearing surfaces which support the roadway structure.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. An elongated, variable thickness, non-woven, integral fiber mat pervious to liquid and which is adapted for use at a stress transition zone juncture, such as for instance at the juncture between a bridge and an adjacent roadway, or at a roadway-railroad grade crossing or the like, said mat being adapted for disposal beneath the roadway proper lengthwise thereof commencing at said juncture for spreading the forces applied to the roadway by traffic moving thereon, over an increased area, said mat being of variable thickness in directions both lengthwise and transverse of said mat, the thickest portion of said mat being located at the forward end thereof, said forward end having a frontal surface which is disposed in a generally vertical plane, and which is adapted for disposal at said juncture, said mat decreasing in thickness lengthwise of said mat in a direction rearwardly from said frontal surface, and decreasing in thickness in a direction transverse of said mat, said transverse decrease in thickness providing a lateral shoulder portion for said mat extending for the full length of the latter and being of generally uniform thickness throughout said length.

2. A mat in accordance with claim 1 wherein said mat in a direction lengthwise thereof is of a stepped configuration and comprises individual layers of fabric material connected together into an integral member, each of said layers being of a predetermined length and width so as to provide said variable thickness of said mat in said lengthwise and transverse directions of said mat.

3. A mat in accordance with claim 2 wherein the mat is formed of at least three layers of non-woven fiberous fabric material, said layers being of different lengths and at least one of said layers being of a wider width as compared to the other of said layers, said wider width layer being the lower most layer in said mat, with said layers being disposed in superimposed relation to form said stepped configuration in directions both lengthwise and transverse of said mat.

4. A mat in accordance with claim 2 wherein each of said layers is of a thickness within the range of approximately 60 mils to approximately 100 mils, said fabric being formed of polyester fiber.

5. A mat in accordance with claim 2 wherein the means connecting the layers together comprises interlocked fibers from the various layers produced by needle punching of the mat.

6. A mat in accordance with claim 2 wherein the layers of fabric material comprise non-woven fabric formed of non-continuous polyester fiber.

7. A mat in accordance with claim 6 wherein the fibers of the non-woven fabric are between approximately 5 to 9 denier.

8. A mat in accordance with claim 1 wherein the fibers of the fabric are crimped.

9. A mat in accordance with claim 1 wherein the mat is multi-layered and is needle punched, thereby providing means connecting the layers of the mat together.

10. A mat in accordance with claim 1 wherein the uppermost surface of the mat includes a layer of flexible non-pervious material.

11. A rectangular shaped, in plan, integral fabric mat of non-woven material adapted for use at a stress transition zone juncture, such as a bridge-roadway juncture, or a railroad crossing-roadway juncture, or the like, said mat being adapted for disposal beneath the roadway generally lengthwise thereof commencing at said juncture, said mat being comprised of a plurality of individual, superimposed layers of non-woven liquid pervious fabric material, and means connecting the layers together into an integral member, said mat having a stepped-like configuration in a direction lengthwise thereof as well as in a direction transversely thereof, one defining side surface of said mat being generally vertically oriented, with the respective defining side surface of the fabric layers being generally coplanar with said one defining side surface of said mat, the other side surface of said mat transversely thereof being of stepped configuration formed by having at least one of said layers being of a greater width as compared to the width of the other layers, with the greater width layer being the bottommost layer in the mat, the thickest portion of said mat being located at the forward end thereof and having a frontal surface which is disposed in a generally vertical plane, the mat thickness lengthwise of said mat diminishing in thickness in a direction rearwardly from said frontal surface and diminishing in thickness in a direction transverse of said mat from said one side surface to said other side surface, resulting in a lateral shoulder portion of generally uniform thickness extending for the full length of said mat.

12. A mat in accordance with claim 2 wherein at least one of said layers possesses a weight of between approximately four to six ounces per square yard.

13. A mat in accordance with claim 2 wherein at least one of said layers has been treated with a resin-like binder to increase the tensile strength of the fabric thereof, and possesses a weight of between approximately eight to twelve ounces per square yard.

14. A mat in accordance with claim 2 wherein certain of said layers possess a weight of between approximately eight to twelve ounces per square yard while the remainder of said layers are of a lesser weight per square yard.

15. A mat in accordance with claim 4 wherein the mat is needle punched thereby providing means connecting the layers of the mat together, at least one of said layers being treated with a resin-like binder material which increases the tensile strength of the fabric thereof, said one layer possessing a weight of between approximately eight to twelve ounces per square yard, the non-treated layers, if any, being of a lesser weight per square yard.

* * * * *